Aug. 17, 1937.  N. ROBINOWITZ  2,090,234
MEAT RACK
Filed Aug. 6, 1936  2 Sheets—Sheet 1
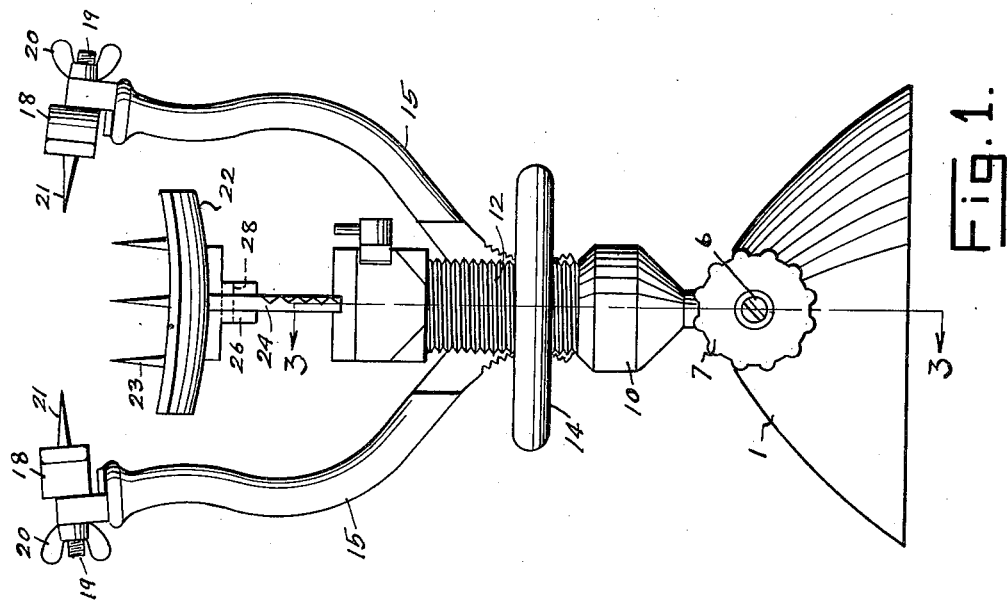
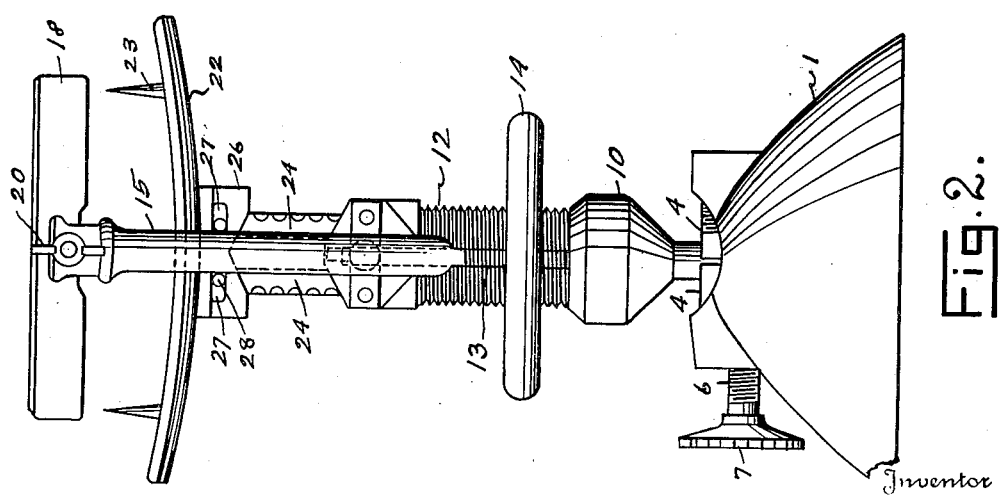

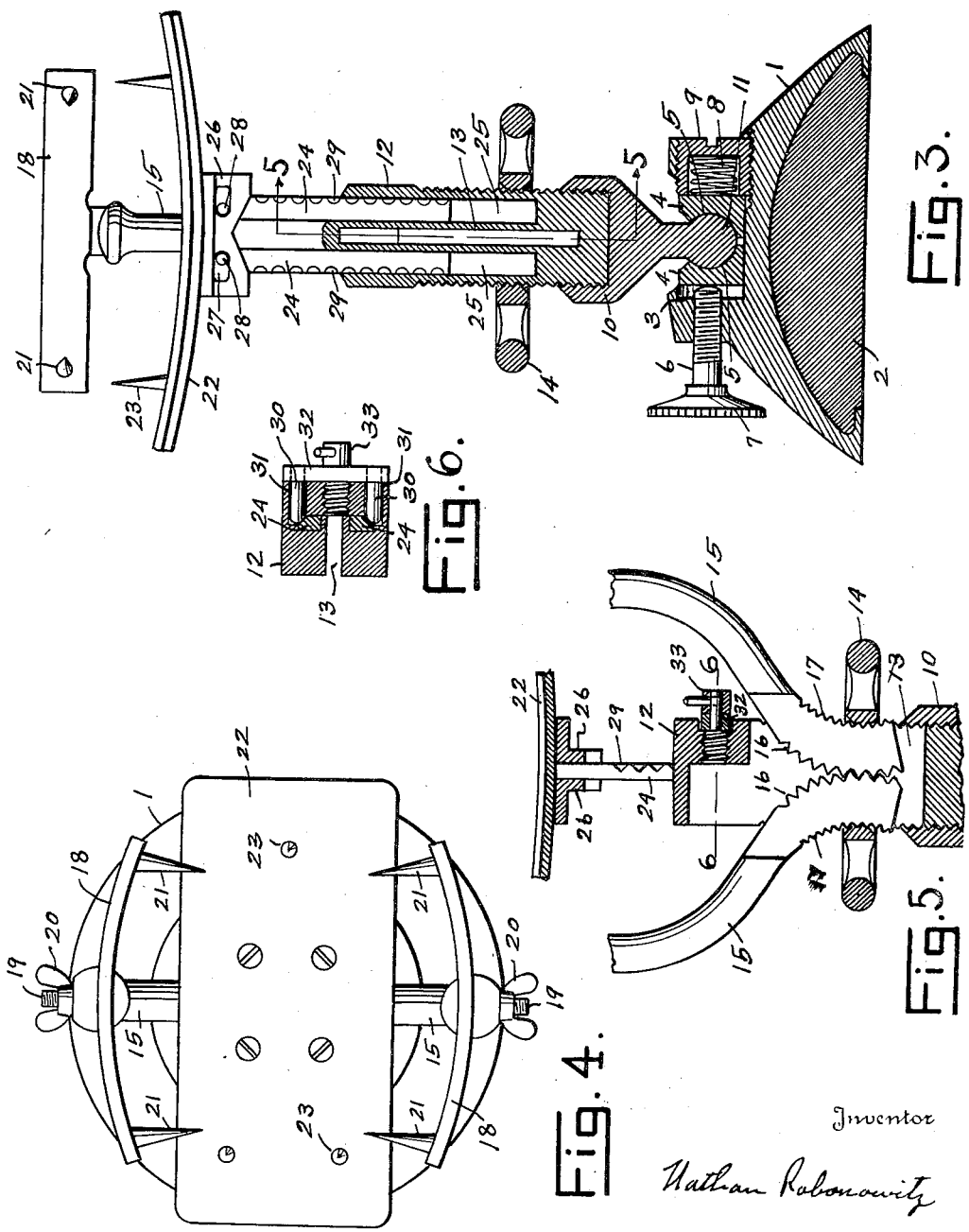

Patented Aug. 17, 1937

2,090,234

UNITED STATES PATENT OFFICE 2,090,234

MEAT RACK

Nathan Robinowitz, Houston, Tex.

Application August 6, 1936, Serial No. 94,571

6 Claims. (Cl. 146—218)

This invention relates to a meat rack.

It is an object of the invention to provide a meat rack, or holder, specially designed for use about delicatessens or meat markets for holding pieces of meat in such position that the same can be readily sliced to be dispensed in sliced form to customers.

It is a particular object of the invention to provide a rack or holder of the character described specially designed to hold pieces of meat containing the bone and which must be adjusted, or repositioned, in the holder from time to time so as to render the meat easily accessible for slicing to the end that all of the meat may be readily sliced from the bone.

Another object of the invention is to provide a meat rack or holder that is readily adjustable into various selected positions and which may then be locked in any position of adjustment.

It is still another object of the invention to provide apparatus of the character described which is of very simple construction, may be cheaply and easily produced and whose parts may be readily replaced.

With the above and other objects in view the invention has particular relation to certain novel features of construction, operation and arrangement of parts, an example of which is given in this specification and illustrated in the accompanying drawings, wherein:

Figure 1 shows a side elevation of the complete rack.

Figure 2 shows a side elevation thereof, taken at right angles to the view shown in Figure 1.

Figure 3 shows a vertical sectional view taken on the line 3—3 of Figure 1.

Figure 4 shows a plan view.

Figure 5 shows a fragmentary vertical sectional view taken on the line 5—5 of Figure 3, and Figure 6 shows a cross sectional view taken on the line 6—6 of Figure 5.

Referring now more particularly to the drawings wherein like numerals of reference designate the same parts in each of the figures, the numeral 1 designates the base which is approximately conical in general contour and which contains a heavy material 2 such as lead forming a weight so that the implement will not be readily overturned. The lower end of the base 1 is flat so as to form a wide support.

The upper end of the base contains a box 3 in which are slidably mounted the complemental bearing members 4, 4 having the inside socket bearings 5, 5. Threaded through the wall of the box 3 on one side there is a hand screw 6 whose inner end abuts one of the bearing members 4. The outer end of the hand screw has a grip member 7 for manipulating said screw.

Bearing against the outer end of the other member 4 there is a strong coil spring 8 which is contained within a cap nut 9. This nut is screwed into the wall of the box 3 opposite the screw 6.

There is an upstanding anchor 10 whose lower end is formed with a ball joint member 11. This joint member is seated in the bearings 5. The screw 6 may be tightened up to cause the bearing members 4 to securely clamp the ball joint member 11 between them to maintain the anchor 10 in upright position or said screw may be loosened to permit adjustment of said anchor. When the screw 6 is loosened the pressure of the spring 8 will be sufficient to cause the ball joint member 11 to be gripped between the bearing members 4 so as to normally maintatin the anchor 10 in upright position but to permit its adjustment.

The numeral 12 designates a cylindrical shank whose lower end is screwed into the upper end of the anchor 10. This shank has a transverse slot 13 extending entirely therethrough and an intermediate portion of the shank is outwardly threaded. A hand wheel 14 is threaded onto said shank as more clearly shown in Figures 3 and 5.

There are the upstanding outwardly curved arms 15, whose lower ends are flattened and reversely curved and fitted into the slot 13. The convex margins of the flattened portions have the intermeshing rack teeth 16, 16, and the outer, or concave margins of the flattened portions have the threads 17, 17 which match with the threads of the shank and of the hand wheel 14 and which intermesh with the threads of said hand wheel as shown in Figure 3. It is obvious that as the hand wheel is turned to adjust it upwardly the upper ends of the arms 15 will be moved inwardly and as the hand wheel is adjusted downwardly the upper ends of said arms will be moved outwardly. When the hand wheel is adjusted downwardly to the limit of its downward movement the arms 15 may then be readily detached from the shank.

Arcuate clamp jaws 18, 18 are secured to the upper ends of the arms 15 with their concave sides inwardly. These jaws 18 have the outwardly extended outwardly threaded studs 19, 19, which are fitted through bearings in the upper ends of the arms 15 and whose outer ends have the wing nuts 20 threaded thereon whereby jaws 18 are secured in place and are rendered capable of the desired adjustments. The ends of the jaws 18 have the inwardly directed pointed prongs 21 for engagement with the object held by the rack.

There is a supporting platform 22 preferably slightly concavo-convex with its concave side upwardly. This platform has the upwardly directed pointed prongs 23 thereon for engagement with the object supported on the rack. The platform is supported on the upper ends of the legs 24. These legs are vertically slidable in the vertical bearings 25 of the shank 12. Their upper ends are fitted between the spaced flanges 26, 26, carried by the underside of the platform. These flanges have the transverse aligned bearings 27, 27 to receive the ends of the pivot pins 28 which pass through the upper ends of the legs 24 whereby the platform is pivotally mounted on said legs. The legs 24 may be vertically adjusted to vary the elevation of the platform 22 and as is obvious the legs may be independently adjusted vertically to vary the pitch or the inclination of the platform.

The outer margins of the legs 24 have the indentations 29. There are the pins 30 which are slidable in the bearings 31 and the outer ends of these pins are attached to the yoke 32. This yoke is mounted to swivel on a clamp screw 33 which has a threaded connection with the shank 12. When the screw 33 is screwed inwardly the pins 30 will engage in the corresponding indentations 29 whereby the legs 24 may be locked at any desired point of adjustment. When it is desired to adjust said legs the screw 33 may be reversed to move the pins 30 outwardly to unseat them from the indentations 29 and the desired adjustment may then be made and the screw 23 again tightened up.

The drawings and description disclose what is now considered to be a preferred form of the invention by way of illustration only, while the broad principle of the invention will be defined by the appended claims.

What I claim is:

1. A rack of the character described comprising a base, a support upstanding from and adjustably mounted on the base, clamp arms whose lower ends have bearings in the support, retaining means around the support and arms and adjustable vertically to effect the lateral adjustment of said arms, clamp means on the upper ends of the arms, a platform on said support, between said arms, and means for adjusting the platform vertically.

2. A rack of the character described comprising a base, a support upstanding from and adjustably mounted on the base, clamp arms whose lower ends have bearings in the support, retaining means around the support and arms and adjustable vertically to effect the lateral adjustment of said arms, clamp means on the upper ends of the arms, a platform on said support, between said arms, and means for adjusting the platform vertically, and for varying the inclination of the platform.

3. A rack of the character described comprising a base, complemental bearing members mounted in the base, and having registering bearings, a support upstanding from the base and having a ball joint member seated in said bearings, means for causing said bearing members to yieldingly clamp said ball joint member, means for causing said bearing members to grip said ball joint member to maintain it against movement, outwardly curved upstanding arms adjustably mounted on the support, clamp means adjustably mounted on the arms, a platform on the support located between the clamp means.

4. A device of the character described comprising a base, a support upstanding from the base having vertical bearings, legs vertically adjustable in said bearings, means for securing the legs at any point of adjustment and a platform mounted on the upper ends of the legs, and clamp means upstanding from the support on opposite sides of the platform and means for adjusting said clamp means toward and from each other.

5. A device of the character described comprising a base, a support upstanding from and adjustably mounted on the base, oppositely arranged clamp arms mounted on said support, means for adjusting said arms toward and from each other, clamp means on the arms, legs mounted for independent vertical adjustment on the support, and a platform between the arms supported by said legs.

6. A rack of the character described comprising a base, complemental bearing members on the base, a support upstanding from the base and mounted in said bearing members, said support having a vertical slot, outwardly curved upstanding arms whose lower ends fit into said slot and are provided with intermeshing rack teeth and external threads, a hand wheel having internal threads which mesh with said external threads, clamp means on said arms, a platform on the support located between the clamp means.

NATHAN ROBINOWITZ.